United States Patent [19]

Silver

[11] 4,441,693

[45] Apr. 10, 1984

[54] JACK ACCESSORY SUPPORT LEG FOR TRAILER HITCH

[76] Inventor: Sidney Silver, 1303 Marie St., Hattiesburg, Miss. 39401

[21] Appl. No.: 383,763

[22] Filed: Jun. 1, 1982

[51] Int. Cl.³ .............................................. B66F 3/10
[52] U.S. Cl. .................................................... 254/420
[58] Field of Search ...................... 254/86 H, 86 R, 98, 254/133 A, DIG. 1, 420; 248/354 S; 403/287, 343, 299

[56] References Cited

U.S. PATENT DOCUMENTS

| | | | |
|---|---|---|---|
| 1,513,252 | 10/1924 | Lampert | 254/133 A |
| 2,504,291 | 4/1950 | Alderfer | 248/354 S |
| 2,594,605 | 4/1952 | Zoppelt | 254/98 |
| 2,929,602 | 3/1960 | Hyre | 248/354 S |
| 3,027,140 | 3/1962 | Holzbach | 254/98 |
| 3,093,362 | 6/1963 | Schaefer | 254/86 R |
| 3,458,173 | 7/1969 | Kornovich et al. | |
| 3,580,543 | 5/1971 | Hafeli | 254/86 R |
| 3,764,109 | 10/1973 | Hollis | 254/86 R |
| 4,174,094 | 11/1979 | Valdespino et al. | 254/86 M |
| 4,221,362 | 9/1980 | Van Santen | 254/98 |

Primary Examiner—Robert C. Watson
Attorney, Agent, or Firm—C. Emmett Pugh & Associates

[57] ABSTRACT

A removeable base plate accessory member for the support jack leg on a trailer hitch providing a flat base stand for a trailer when the trailer is being parked and left in a particular area. The base plate member is easily attachable to or detachable from the support leg and may be adjusted to vary the relative height or distance between the accessory's base plate and its attachment connector leg used to attach the base plate to the support leg of the standard type jack found on most trailer hitches. The preferred connector (FIGS. 2 and 3) includes a pipe section with a bottom plate welded to it with a centrally located opening with a nut welded to the bottom plate, with the base plate member having a vertically extending centrally located threaded stud threadably engaging the nut.

4 Claims, 2 Drawing Figures

JACK ACCESSORY SUPPORT LEG FOR TRAILER HITCH

BACKGROUND OF THE INVENTION

1. Field of the Invention:

The present invention relates to an easily removeable and attachable and adjustable base plate member or accessory for the support jack on a trailer hitch.

2. Prior Art:

Trailer hitches are necessary for attaching trailers to vehicles for moving the trailers.

A common component on a trailer hitch is a trailer support jack leg. This jack leg is used to support the trailer hitch above the ground when the trailer is not hitched up to a vehicle. Such a trailer support leg is adjustable in height to allow the leg to be raised by the jack up out of the way when the trailer is hitched to a vehicle for movement and lowered down into ground engagement when support of the hitch by the leg is desired. These jacks may be mechanical, hydraulic or electric.

The trailer jack leg typically rests on some sort of base which in turn rests on the ground. This base may be a wheel (see for example FIG. 4, U. S. Pat. No. 3,458,173 issued July 29, 1969 to D. W. Kornovich et al) or a laterally extended, generally flat, base plate member (see FIGS. 1–3 of the '173 Patent). The use of a wheel or a small base plate may not provide the type of support required in setting up trailers in many circumstances. For example, a wheel may sink too deeply into the surface on which the leg sits. Additionally, other supports may be too unsteady, requiring additional supports to shore up the support leg.

The prior art in this area provide for the uses of some base plates. However, these flat supports are not easily attachable or detachable or have no fastening means for fixing the base plate to the jack leg when the leg is raised. Additionally, the present base plates are not adjustable and hence the height of the trailer hitch and the angle at which the trailer stands cannot be varied, unless a separate, possibly adhoc and unsteady base is added below the normal base of the support leg. Additionally, some of the base plate connectors were relatively weak, cumbersome and expensive in construction, and/or unsuitable.

The present invention addresses these problems.

GENERAL DISCUSSION OF THE INVENTION

The present invention offers a removeable base plate which can be substituted for any existing base support on a trailer hitch jack. The existing support may be a wheel or a nonremoveable base plate or the end of a support leg without any base attachment.

The attachment or detachment of the base plate in the preferred embodiment is easily made by the tightening or loosening of a single bolt tightened into the support leg of the trailer. In this way, if the support leg's original base is removed, the new base plate may be easily fitted or removed to reattach the original base or to work on the support leg itself.

The base itself has a laterally extended, broad, flat bottom which rests on the ground in face-to-face engagement and does not easily sink in any surface, nor will it slide, thus providing a steady support for the support leg and hence for the trailer itself.

In the preferred embodiment the height at which the trailer sits on the plate may be varied by means of a hollow, outer, threaded pipe section connector with a welded nut in it for engaging a bolt stud attached to the base plate. When the proper adjustment in height is made by means of screwing or unscrewing base plate, the system may then be used to support the trailer at the desired height.

The invention therefor serves two novel purposes. First, it allows for a base for a trailer support which can be easily removed or attached to an existing support leg. In this way no matter what type of base comes with the trailer support, the particular type of base of the invention may be attached. Second, it provides for a means of adjusting the height of the support leg regardless of whether the support leg incorporates a jack and regardless of whether an incorporated jack is working. Because the adjustable base plate sub-section is made of only a few small parts it is relatively inexpensive, yet high in strength and reliability.

BRIEF DESCRIPTION OF THE DRAWINGS

For a further understanding of the nature and objets of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 1:
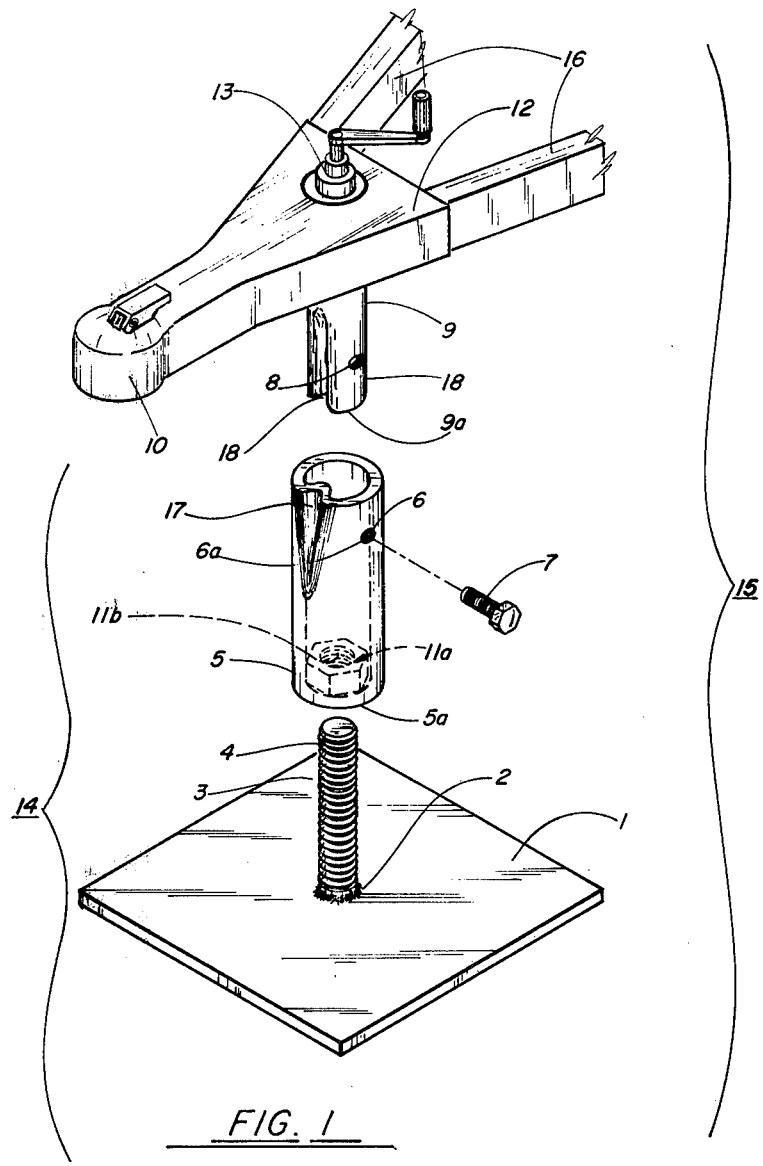
FIG. 1 is an exploded, perspective view of the preferred embodiment of the invention as attached to a trailer support jack leg.
Figure 2:
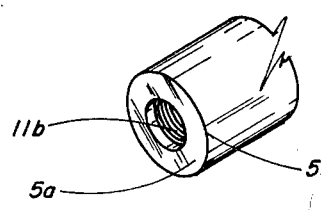
FIG. 2 is an end perspective view of the connector element of the embodiment of FIG. 1.

With reference to the drawings, there is shown in FIG. 1 in a perspective, exploded view, a standard-type trailer hitch 10 fixed to the "trailer" by structural beams 16. The trailer hitch 10 includes a solid top 12 to which is bolted a jack 13 which extends through the hitch top 12. Although a hand-cranked jack 13 is illustrated, the jack of course could be some other form of mechanical jack or could be hydraulically or electrically driven. Extending down from the jack 13 is a support leg 9 which is moved up and down under the action of the jack. The foregoing are standard-type items readily available in the industry.

The accessory base member 14, representing the preferred embodiment of the present invention, includes a pipe-like connector member 5 to which is threadably attached a base support plate 1, welded by a weldment 2 to the solid, threaded, bolt stud 3 having standard helical threads 4 on its exterior. At the bottom of the attachment pipe 5 there is included a welded bottom plate 5a having a central opening. A nut 11, having internal threads 11b, is welded to the bottom 5a with its threaded opening 11a centrally disposed over and in line with the circular opening in the bottom 5a.

The pipe connector 5 with its threadably engaged base plate 1 is fastened to the bottom 9a of the jack leg 9 by means of an externally threaded, retaining bolt 7 which threadably engages the interiorly threaded, side opening 6 in the pipe connector 5. The pipe connector 5 is slid over and around the lower end 9a of the jack leg 9 in telescoping fashion.

When the pipe connector 5 is properly positioned over the lower end 9a of the jack leg 9 so that the leg hole 8 is in alignment with the threaded opening 6, the retaining bolt 7 is screwed down into the threaded opening 6 until its shank extends through the leg hole 8 fastening the pipe connector 5 to the jack leg 9. For further fastening security between the trailor support, jack leg 9 and the pipe coupler 5, they are appropriately, matingly grooved and oppositely but similarly deformed in the longitudinal direction so that one external groove 18 fits in and mates with the other, internal groove 17 as the pipe coupling is slid up and over the jack leg 9. The presence of these mating grooves or deformities allows for relative longitudinal movement but prevents rotational movement of the two otherwise cylindrical elements 9, 5, and also assists in the proper circumferential alignment of the mating holes 6 and 8 which have comparable diameters, with the unthreaded hole 8 having a very slightly larger diameter.

The threading engagement between the base plate member 1 with its threaded bolt stud 3 to the pipe connector 5 with its fixed threaded, connector nut 11 allows the relative height or distance between the base plate 1 and the fastening hole 6 to be varied, thereby varying the effective length of the base plate leg accessory to be changed, as needed or desired. The particular structure of a cylindrical pipe member 5 with a welded bottom 5a to which is welded a heavy duty nut 11 for the overall base plate connector assembly provides a very simple, easily and relatively inexpensively manufactured item but produces a connector portion which is highly reliable and strong. However, of course, if desired other threaded structures or structural arrangements are possible.

It is noted that the foregoing disclosed base plate connector 14 can be readily and easily attached to or removed from the jack leg 9 to allow for replacement with, for example, a support wheel or, for example, for complete removal of the jack and its leg from is bolted attachment to the top 12 of the trailor hitch 10. Because of the fastening means 7, the base accessory 14 can be left on the jack support leg 9 when the jack 13 is raised.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. An improvement in a trailer hitch support system including
    a trailer hitch; and
    jack up means having a jack leg, attached to the hitch for intermittently supporting the trailer hitch end of a trailer on a support surface; the improvement comprising:
    a base support member removeably attached to the jack leg; said base support member comprising
    a laterally extended base plate member having an extended flat surface on its underside for contacting in face-to-face engagement the support surface;
    a threaded stud fixedly attached to said base plate member and extending vertically up from the center area of the upperside of said base plate member;
    a connector formed from an at least generally cylindrical, pipe section member associated with said threaded stud, said connector havin threaded portion means defining a threaded opening for matingly and threadingly engaging said threaded stud for allowing the separation distance between said base plate member and said connector to be varied, said connector further including a cylindrical section having a bottom opening, said threaded portion comprising a threaded nut fixedly attached to said pipe section member with is threaded interior communicating in line with said bottom openings, said connector further including a bottom plate with a centrally located opening, said bottom plate being welded to the bottom portion of said connector, said nut being enclosed within said pipe section member and being welded to the upper side of said bottom plate with its threaded interior communicating in line with said centrally located opening; and
    fastening means associated with said connector for fastening said connector and hence said base plate member to the lower end of the jack leg.

2. The support system of claim 1, wherein the jack leg is at least generally cylindrical in shape, and wherein there is included like, circular side openings of comparable diameters in said connector and the jack leg, and wherein said fastenings means comprises a pin-like member extendable through said side openings for connecting said connector and the jack leg together.

3. The support system of claim 2, wherein the side opening in said connector includes an interiorly threaded portion, and said pin-like member has an externally threaded portion for threadingly and mating engaging said connector through said interiorly threaded portion.

4. The support system of claim 2, wherein the exterior side surface of the jack leg and the interior side surface of said connector have longitudinally extending, opposite but similarly deformed portions which mate with one another allowing relatively longitidinal, telescoping movements but preventing relative rotational movements.

* * * * *